(12) United States Patent
Rupf et al.

(10) Patent No.: US 8,688,291 B2
(45) Date of Patent: Apr. 1, 2014

(54) METHOD FOR DATA EXCHANGE IN A TRANSPORT SYSTEM AND VEHICLE CONTROL SYSTEM

(71) Applicant: Siemens Aktiengesellschaft, Munich (DE)

(72) Inventors: Stephan Rupf, Claussnitz (DE); Horst Wolf, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/655,063

(22) Filed: Oct. 18, 2012

(65) Prior Publication Data

US 2013/0110313 A1 May 2, 2013

(30) Foreign Application Priority Data

Oct. 27, 2011 (EP) .................................... 11186921

(51) Int. Cl.
*G06F 17/00* (2006.01)
(52) U.S. Cl.
USPC ..................... 701/1; 340/146.2; 340/870.18
(58) Field of Classification Search
USPC .............................. 701/1; 340/146.2, 870.18
See application file for complete search history.

(56) References Cited

U.S. PATENT DOCUMENTS 5,050,188 A 9/1991 Dirr

FOREIGN PATENT DOCUMENTS

| DE | 37 19 670 | 12/1988 | |
| DE | 3719670 A1 * | 12/1988 | ............. H03M 5/22 |
| DE | 10 2007 056 318 | 10/2008 | |
| GB | 1 241 860 | 8/1971 | |

* cited by examiner

*Primary Examiner* — Mary Cheung
*Assistant Examiner* — Brian P Sweeney
(74) *Attorney, Agent, or Firm* — Cozen O'Connor

(57) ABSTRACT

A vehicle control system for data exchange in a transport system, where a control unit is configured to transfer control commands to a vehicle configured to transfer status messages to the control unit, where a signal generator is connected to a first data line and a second data line and provides a changeover signal, a first switching means is arranged in the control unit and is configured to change positive half-waves of the changeover signal, and a second switching means is arranged in the vehicle and is configured to change negative half-waves of the changeover signal, in a circuit formed by the first and second data lines to transfer binary values back-and-forth between the control unit and the vehicle.

21 Claims, 4 Drawing Sheets

METHOD FOR DATA EXCHANGE IN A TRANSPORT SYSTEM AND VEHICLE CONTROL SYSTEM

BACKGROUND OF THE INVENTION

1. Field of the Invention

The invention relates to a method for data exchange in a transport system, where control commands from a control unit are transferred to a vehicle, and status messages from the vehicle to the control unit, where a changeover signal is provided by a signal generator, and the changeover signal is switched to a first data line and a second data line, and where the time sequence of the changeover signal is changed to transfer the control commands and/or the status messages via the changes.

The invention further relates to a vehicle system for data exchange in a transport system, where a control unit is arranged to transfer control commands to a vehicle, and a vehicle is arranged to transfer status messages to the control unit, and where a signal generator is connected to a first data line and a second data line and provides a changeover signal.

The terms "control commands" and "status messages" are understood to mean data transfers that are acknowledged or not acknowledged.

Within the meaning of the invention, the term "transport system" is understood to mean a system of conveyance with automatically controlled vehicles, the object of which is to transport material or personnel. By way of example, an electric suspended railway is a transport system. An electric suspended railway is a rail-bound conveyance system with individually powered vehicles. The vehicles can move autonomously and independently of one another on the rail system.

2. Description of the Related Art

In transport systems, a transport track, such as a rail system, is subdivided into sections, for preference into segments, where vehicles or transport wagons can move on these segments in almost any number desired.

In order for the behavior and therefore the travel profile of a transport wagon within the transport system, such as a production system for automobile manufacture, to be adapted to the different manufacturing processes, communication is necessary between a central system control and the transport wagons. It is a further advantage for the central system control if it is informed of the behavior of the transport wagons in real time.

A transport system and a method for data exchange in the transport systems is known from the technical description from the company LJU Automatisierungstechnik GmbH, "Transport wagon control system, Series ST-79x". A disadvantage with this conventional method and device is that, for the communication from a control unit or a central system control respectively to the vehicles and vice versa, a separate control rail and a separate message rail must be used, where these exhibit an unsymmetrical data transfer, which is prone to faults.

SUMMARY OF THE INVENTION

It is therefore an object of the present invention to provide a simplified method and a simplified vehicle control system respectively for data exchange, which exhibits greater operational reliability.

This and other objects and advantages are achieved in accordance with the invention by a method for data exchange in a transport system, in which control commands are transferred from a control unit to a vehicle and status messages are transferred from the vehicle to the control unit, where a changeover signal is provided by a signal generator, and the changeover signal is switched to a first data line and a second data line, where the time sentence of the changeover signal is changed to convey the control commands and/or the status messages via the changes, where a first switching device is operated in the control unit to change the positive half-waves of the changeover signal, and a second switching device is operated in the vehicle to change the negative half-waves of the changeover signal, in a circuit formed by the first and second data lines, such that binary values are transferred back-and-forth between the control unit and the vehicle, and where the data exchange of the control commands and the status messages occur almost simultaneously via the changed changeover signal. Preferentially, a carrier signal is produced with the changeover signal, on which a useful signal is imposed by the first and second switching devices. This imposition of the useful signal can be regarded as a type of modulation, and allows for the transfer of data for a forward channel as control commands and for a return channel as status messages via a single circuit. The transfer occurs, so to speak, in a time-multiplex process in a baseband, where the basic frequency of the changeover signal is the baseband and the masking out of individual half-waves one after the other occurs almost simultaneously, i.e., multiplexed in time. A low fault incidence is achieved by a symmetrical, differential, and potential-free transfer.

In order to facilitate the filtering out of the individual half-waves, in a further embodiment, a first decoupling device is located in the control unit, in order to conduct the negative half-waves to a first evaluation device and thereby detect the status messages, and a second decoupling means is located in the vehicle, in order to conduct the positive half-waves to a second evaluation device and thereby detect the control commands. The issuance of control commands from the control unit to the vehicle can be designated as a forward channel, and the issuance of status messages from the vehicle to the control unit can be designated as a return channel. The decoupling device can, for example, be arranged as a diode-decoupling of the forward and return channels, which therefore allow for an advantageous activation of the first and second switching devices for better readability of the binary signals.

A further improvement of the data exchange is achieved if the signal generator is operated such that it provides the changeover signal for a limited period of time as a message packet, and this provision of the message packet is repeated cyclically. Preferably, the signal generator therefore does not produce a continuous signal but permanent message packets, i.e., frames, particularly as "bursts", each precisely of a defined length.

It is further of advantage if each message packet is provided with a beginning identifier signal, which differs in frequency, waveform, or amplitude from a carrier signal of the changeover signal, and thereby identifies a start point of the message packet. Due to the fact that this identifier signal differs in its frequency from a basic frequency of the changeover signal or, respectively, from the frequency of the changeover signal or, respectively, from the frequency of the baseband, or in its waveform from the waveform of the changeover signal, or in its level/amplitude from the level/amplitude of the changeover signal, the identifier signal can therefore unambiguously be filtered out of a data stream for the transfer of control commands or status messages.

Preferably, a plurality of travel segments are used in the transport system as transport paths for the vehicle, where a signal generator is allocated to each travel path.

In this situation, a travel segment or a plurality of travel segments form a specific group in the transport system, and the signal generators contained in the groups are synchronized jointly. Taking the example of an electric suspended railway, which travels on a segment and maintains its data communication by current collectors over corresponding data conductor rails, it may occur, at the transition from one segment to a next segment, that the collector incurs a short-circuit precisely between the two segments. In order for such communication conductor rail short-circuits between adjacent segments to be tolerated, with low loss of communication, it is of advantage to synchronize all the signal generators for the individual segments within a group. Only in this way is it guaranteed that, even in the event of short-circuits between the synchronized segments, defined relationships will always prevail with regard to the time sequence of the data message packet.

It is further of advantage for a checksum to be formed for each control command and for each of the status messages, and for this likewise to be transferred. Here, it is now intended that control commands and status messages should be transferred error-free over a transfer channel. Consequently, it must be ensured that, in the event of faults, such as a short-circuit, communication can be restored without notable data loss. Faults can be: Short-circuits between several segments, or short-circuits between the information lines in a segment. In order to identify errors caused by faults, or even rectify them, the checksum is provided, where the checksum is formed on the data which is to be transferred or the data to be transferred is formed on the checksum, and, as a securing mechanism, a plausibility check occurs between the data to be transferred and the checksum. If the plausibility check is negative, this transfer of control command or status message will be rejected, and a new transfer will occur.

Particularly for an electric suspended railway, in one embodiment a loop network is formed with the first data line and the second data line between the control unit and the vehicle and, in the event of a fault in the data exchange in the loop network, this fault will be identified by a securing mechanism, i.e., in the event of a short-circuit between two travel segments incurred by a collector of the vehicle, which is traveling from one travel segment to an adjacent travel segment. This offers the decisive advantage that the segments can be installed such that, when the collectors or transport wagon loop elements cross segment boundaries or segment connections, short-circuits may occur between the information lines to the adjacent segments.

It is also an object of the invention to provide a device comprising a vehicle control system for data exchange in a transport system, where a control unit is arranged to transfer control commands to a vehicle and a vehicle is arranged to transfer status messages to the control unit, where a signal generator is connected to a first data line and to a second data line, and provides a changeover signal. Here, a first switching device is arranged in the control unit to change the positive half-waves of the changeover signal, and a second switching device is provided in the vehicle to change the negative half-waves of the changeover signal in a circuit formed by the first and the second data lines, in order to transfer binary values back-and-forth between the control unit and the vehicle. Advantageously, use can now be made of a single transfer channel, which is formed by the circuit, for the transfer of status messages and control commands. A forward channel and a return channel are set up symmetrically, so to speak, over a single pair of communication rails, and there is no need for a command rail and a message rail to be explicitly provided, such as constitutes a disadvantage in the prior art.

In a further embodiment of the vehicle control system, a first decoupling unit is arranged in the control unit, which is in connection with a first evaluation device, in order to conduct the negative half-waves to the first evaluation device, and thereby detect the status messages, and a second decoupling means is arranged in the vehicle, which is in connection with a second evaluation means, in order to conduct the positive half-waves to the second evaluation device, and thereby detect the control commands. Accordingly, in an advantageous manner, the data exchange can be performed in a multiplex process. The transfer direction for the control commands can be regarded as a forward channel, and the transfer direction for the status messages as a return channel, where the forward and return channels are temporally interleaved by the positive and negative half-wave information, but nevertheless are separated from one another.

In a further preferred embodiment, the signal generator is connected to a first arithmetic unit that is arranged to actuate the signal generator such that the changeover signal is provided for a limited period of time as a message packet, and this provision of the message packet is repeated cyclically.

Preferably, each message packet is provided with a beginning identifier signal, which differs in frequency, waveform, or amplitude from a carrier signal of the changeover signal, and thereby identifies a start point of the message packet.

Depending on the arrangement of the transport system, it exhibits a plurality of travel segments as transport paths for the vehicle, where a signal generator is allocated to each travel segment. Each travel segment can therefore be provided with control commands by a signal generator that is allocated to it alone. It is, however, also possible for several segments to be connected to one signal generator.

Due to the fact that the control commands and the status messages are provided with a checksum for the recognition of errors, the control unit has a first error recognition device, and the vehicle has a second error recognition device. If, for example, due to short-circuits, faults are incurred on the data lines, and therefore errors are produced in the messages, then these errors can be recognized by the error recognition device, and the fault can be reacted to in the appropriate manner.

In particular for the arrangement of a vehicle control system as an electric suspended railway, the first data line and the second data line form a loop network between the control unit and the vehicle, and, in the event of a fault in the data exchange in the loop network, this fault can be identified by the error recognition device, i.e., in the event of a short-circuit between two travel segments incurred by a collector of the vehicle, which is traveling from one travel segment onto an adjacent travel segment.

In a further embodiment, the first arithmetic unit is arranged to control the first switching device such that the binary values are imposed on the changeover signal by the switching of the first and second switching devices, in that a half-wave is suppressed. This also applies in exactly the same way to the second arithmetic unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an embodiment of the vehicle system for a transport system and the method suitable for running in the vehicle control system, in which.

DETAILED DESCRIPTION OF THE PREFERRED EMBODIMENTS

Figure 1:
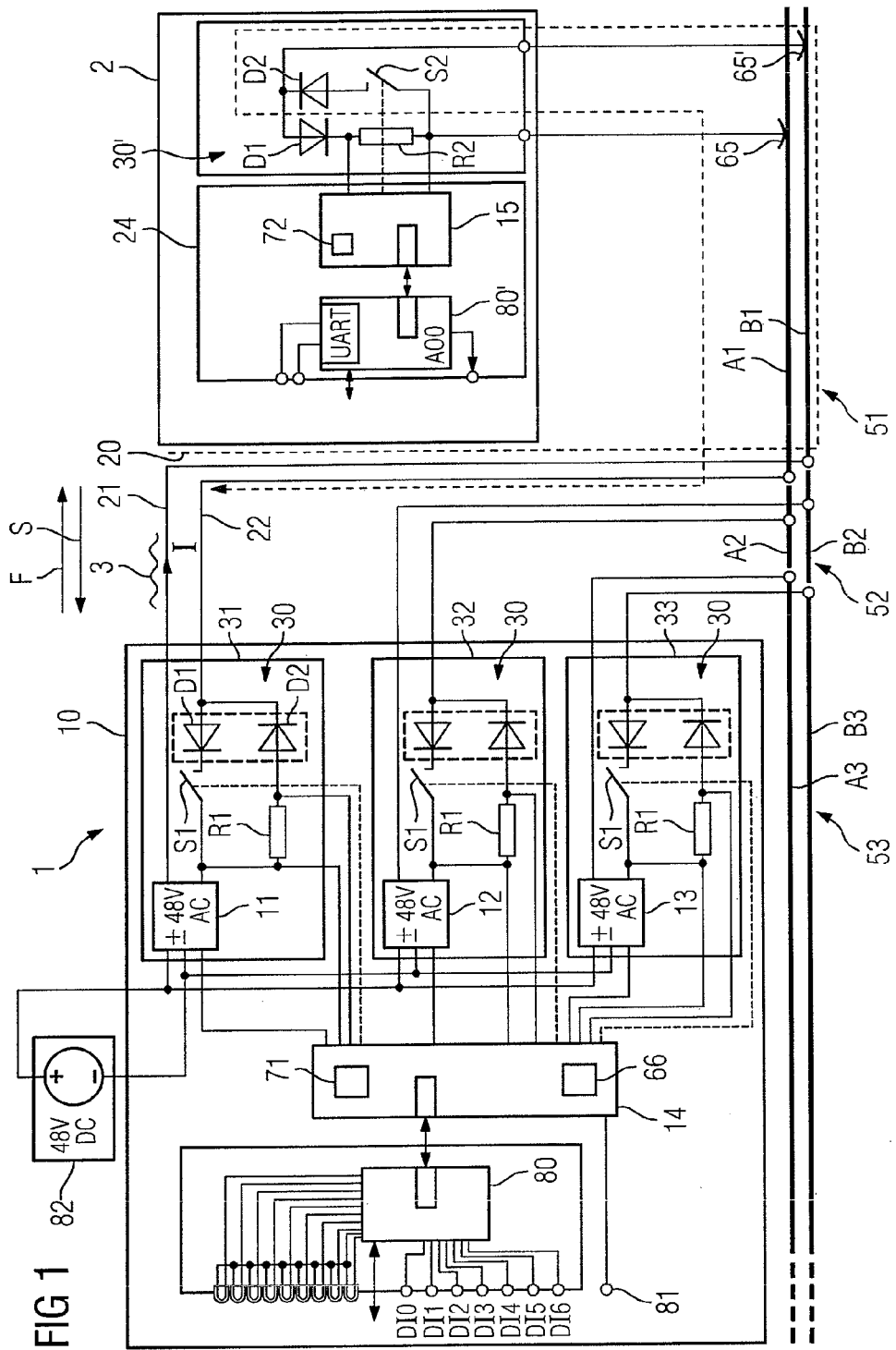
FIG. 1 is a schematic block diagram of a transport system with a control unit, a vehicle, and vehicle segments in accordance with the invention.

FIG. 1 shows a transport system 1, such as an electric suspended railway. A vehicle control system for data exchange in the transport system 1 has a control unit 10 and a vehicle 2, where the control unit 10 can exchange control commands F and status messages S over a first data line 21 and a second data line 22.

The representation of the transport system 1 is restricted to a section from a total transport system, where, for the transport system 1 represented, a first travel segment 51, a second travel segment 52, and a third travel segment 53 are connected to the control unit 10. For each of the three segments 51, 52, 53, there is available respectively a first power section 31, a second power section 32, and a third power section 33.

The function in principle of the data transfer is described by the example of the first travel segment 51, which is connected via the first data line 21 and the second data line 22 to the first power section 31. The first power section 31 has a first signal generator 11, which in turn is supplied with a voltage of, for example, 48 volts DC voltage from a voltage source 82. With the aid of the voltage source 82, the first signal generator 11 produces, for example, a voltage with an amplitude of +/−48 volts and a frequency of, for example, 200 Hz. Accordingly, a changeover signal 3 is provided for a future data transfer of control commands F to the vehicle 2.

Starting from the first signal generator 11, a current I incurred by the AC voltage can flow via the first data line 21 to a second conductor rail B1 of the first travel segment 51. From there, the current I flows via the second conductor rail B1 to a second collector 65', and from the second collector 65' the current I can flow to the second decoupling device 30' arranged in the vehicle 2.

The second decoupling device 30' comprises a diode decoupling device. Due to the fact that, with the changeover signal 3 that is transmitted, in the first instance the positive half-wave of the changeover signal 3 is on the way, the current I can flow via the anode of the first diode D1 of the second decoupling device 30' over the second evaluation device R2, where, due to the current flow, a voltage drop is incurred at the second evaluation device R2.

Continuing the flow of the current I, the current I flows out of the second evaluation device R2, and onto a first collector 65, as a result of which the current I can flow in the first conductor rail A1 of the first travel segment 51. From here, the current I flows along the first conductor rail A1 as far as a connection point of the second data line 22. The second data line 22 connects one end of the first conductor rail A1 to the first power section 31 of the control unit 10. The current path described creates a circuit 20, which is represented in FIG. 1 as a broken line.

Arranged inside the first power section 31 is a first decoupling device 30. Connected to the first decoupling device 30 is the second data line 22, which again accommodates the current I emitted with the changeover signal.

Arranged in the first power section 31 is a first switching device S1, for changing the positive half-wave of the changeover signal 3. Before the current I driven from the first signal generator 11 with the positive half-wave can return to the first signal generator 11, the current I must pass over the first switching device S1, where, via the first decoupling device 30 of the first power section 31, because of the first diode D1, only the positive half-waves can be conducted via the first switching device S1.

The first switching device S1 is connected via a broken line of action to a first arithmetic unit 14. The first arithmetic unit 14 is in this situation set up to include such an appropriate control program, such that it switches the first switching device S1 such that the first switching device S1 opens the circuit 20 and closes it again in way that, due to the switching of the first switching device S1, the binary values for a control command F are imposed on the changeover signal 3, inasmuch as, depending on the information bit, a half-wave is suppressed or allowed through. Because the current flow in the circuit 20 is now interrupted by the first switching device S1, only one voltage can drop at the second evaluation unit R2 when the first switching device S1 is closed. In this situation, with the aid of the second decoupling device 30' in the vehicle 2, the positive half-wave is conducted to the second evaluation device R2 and, as a result, the control commands F or, respectively, the binary values contained in the control commands F, can be detected in a serial manner.

For binary values rendered in "morse" form in this way by the first switching device S1, the second evaluation device R2 in the vehicle 2 is connected to a second arithmetic unit 15. In this situation, the second evaluation device R2 is formed as a series resistance located in the circuit 20, by which a voltage drop can be measured. Integrated in the second arithmetic unit 15 is an analog-digital converter, which evaluates this measurable voltage drop.

By means of the second decoupling device 30' arranged in the vehicle 2, only the positive half-waves emitted from the first signal generator 11 can accordingly incur a voltage drop at the series resistance, and only when the switch of the first switching device S1 is closed. This current path described, via the first diode D1 of the second decoupling device 30', corresponds to a forward channel for the transfer of control commands F.

Building on the current flow as shown for the positive half-waves, and therefore for the forward channel, the current flow for the negative half-waves and therefore for the return channel is then shown.

For the serial data transfer method, the negative half-wave of the changeover signal 3 is now shown over the path of the first data line 21, the second conductor rail B1, the second collector 65', and the second decoupling device 30' of the vehicle 2. Due to the fact that the negative half-wave is now present at the second decoupling device 30', the current I incurred by the negative half-wave can flow via the cathode of the diode D2 of the second decoupling device 30', via the second switching device S2 (if this is closed), and via the first collector 65 back to the first conductor rail A1, and therefore via the second data line 22 back to the first power section 31, and, in turn, via the cathode of the diode D2 of the first decoupling device 30, back to the first signal generator 11. The current I incurred by the negative half-wave, in the same way as at the second evaluation device R2 in the vehicle 2, creates a voltage drop at a first evaluation device R1 in the first power section 31, because the first evaluation device R1 is likewise designed as a series resistance located in the current path. This series resistance is in turn in connection with the first arithmetic unit 14 of the control unit 10, and the voltage drop can therefore be measured at the series resistance. In this case, the second switching device S2 provides for the closing of the circuit 20 shown, or, respectively, for the opening of the current 20 shown, and can, as a result, transfer binary values as a status message S in serial fashion to the control unit 10 in the return channel.

This data exchange of the serial binary values for the control commands F and of the serial binary values for the status messages S now occurs almost simultaneously, or in a time-multiplex process.

The second power section 32 likewise has a second signal generator 12, which provides the changeover signal for the second travel segment 52. The third power section 33 has a third signal generator 13, which provides a changeover signal for the data transfer for the third travel segment 53.

Due to the fact that the first arithmetic unit 14 has synchronization means 66, the signal generators 11, 12, 13 for the travel segments 51, 52, 53, which form a group, are automatically synchronized jointly.

The first arithmetic unit 14 is connected to a first interface switching circuit 80 via an interface. The first interface switching circuit 80 serves to provide the connection to a memory-programmable control unit, and can additionally actuate digital outputs D10 to D16. In addition, the first arithmetic unit 14 has a synchronization connection 81. The synchronization connection 81 serves to synchronize this control unit 10 with further control units, which are connected together to form a group.

The vehicle 2 also has a second interface switching circuit 80', which is connected to the second arithmetic unit 15 via an interface connection. The second interface switching circuit 80' serves in turn to switch to a memory-programmable control unit which is arranged in the vehicle 2.

Figure 2:
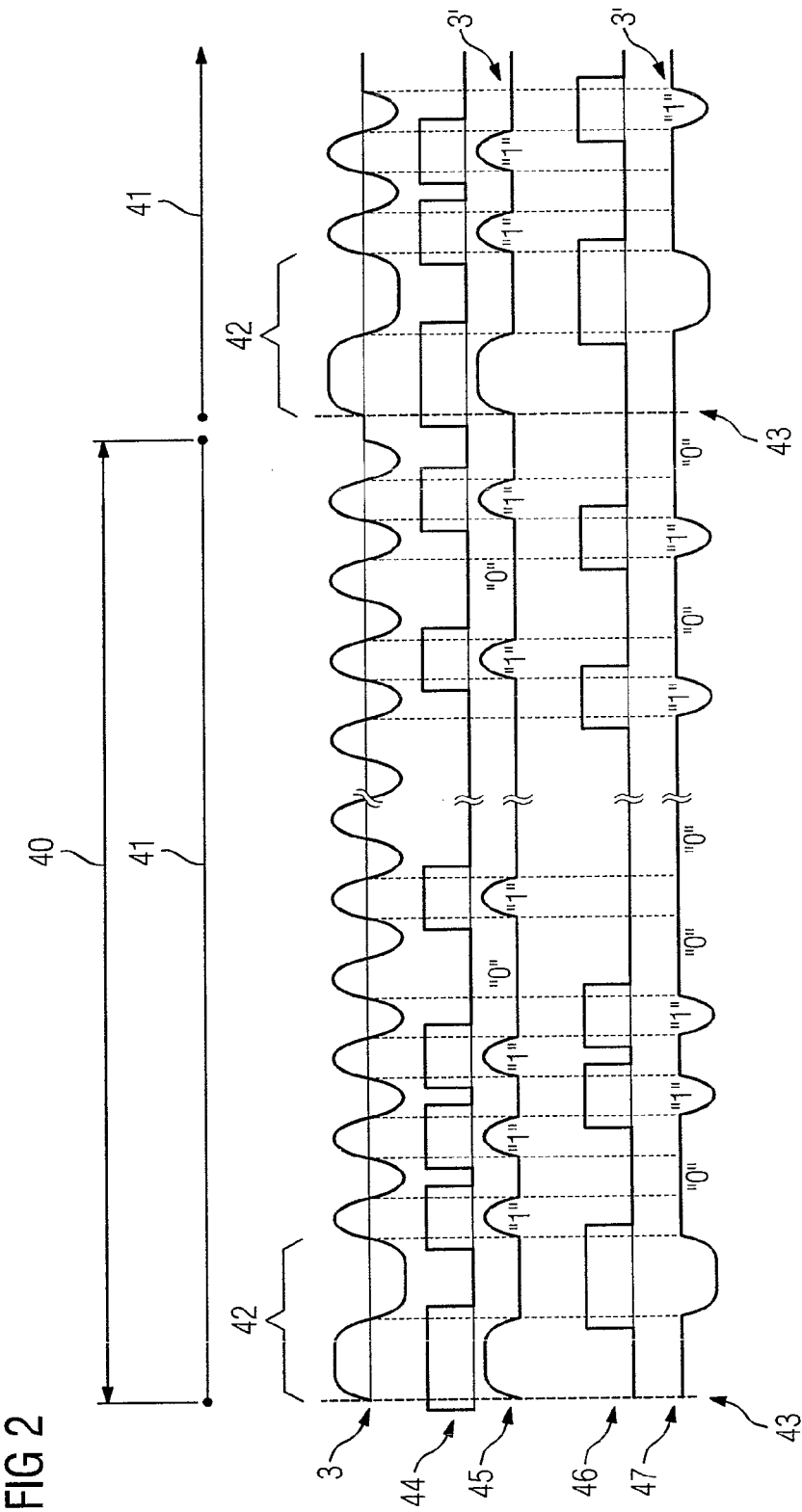
FIG. 2 is a timing diagram of signal characteristics of the changeover signal, switch settings of the first and second switching devices, and voltage characteristics in accordance with the invention.

According to FIG. 2, the time sequence of the changeover signal 3, which is produced, for example, by the first signal generator 11, represents a time sequence 44 of the switching position of the first switching device S1, a voltage characteristic 45 at the second evaluation device R2, a time sequence 46 of the switching position of the second switching device S2, and a voltage characteristic 47 at the first evaluation device R1. The voltage characteristics 45, 47 correspond to the respective changed changeover signal 3'.

The changeover signal 3 is transmitted for a limited period of time 40. This limited period of time corresponds to a message packet 41. The provision of the message packet 41 is repeated cyclically. Starting from a start point 43 shown on the left in the drawing, the changeover signal 3 exhibits an identifier signal 42, which differs in its frequency and waveform from the amplitude of the actual carrier signal of the changeover signal 3, and therefore identifies the start point 43 of the message packet 41.

The program control in the first arithmetic unit 14 is configured such that, at a signal flank at the synchronization connection 81, by way of the synchronization device 66, it produces the identifier signal 42, and keeps the first switching device S1 closed, for reliable recognition of the identifier signal 42, for at least the positive half-wave of the identifier signal 42. The negative half-wave of the identifier signal 42 is followed by three positive half-waves of the changeover signal 3, which represent the respective binary value "1" of a control command F. Due to the fact that, for the fourth positive half-wave after the identifier signal 42 of the changeover signal 3, the first switching means S1 is actuated such that the switch is not closed, i.e., is open, the positive half-wave cannot be perceived as a voltage drop at the second evaluation means R2, and the binary value "0" is therefore represented. With the closing of the switch of the first switching device S1 the binary value "1" is transferred and with the opening of the first switching device S1 the binary value "0" is transferred. The serial transfer of the binary values "1" or "0" provides, for example, a data pattern 16 bits long for a control command F.

For the transfer of status commands S, a similar binary data transfer occurs with the voltage characteristic 47 at the first evaluation device R1, although the negative half-wave of the changeover signal 3 is now evaluated. For the evaluation of positive half-waves and negative half-waves, the first decoupling device 30 interacts with the second switching means S2 and the second decoupling device 30' interacts with the first switching means S1. The method is characterized by the fact that, per half-wave, the switching device and the evaluation device are constantly being alternately activated at the different locations, i.e., on the one hand, in the control unit and, on the other hand, in the vehicle. The signal generator, however, always remains at the location in the control unit.

Figure 3:
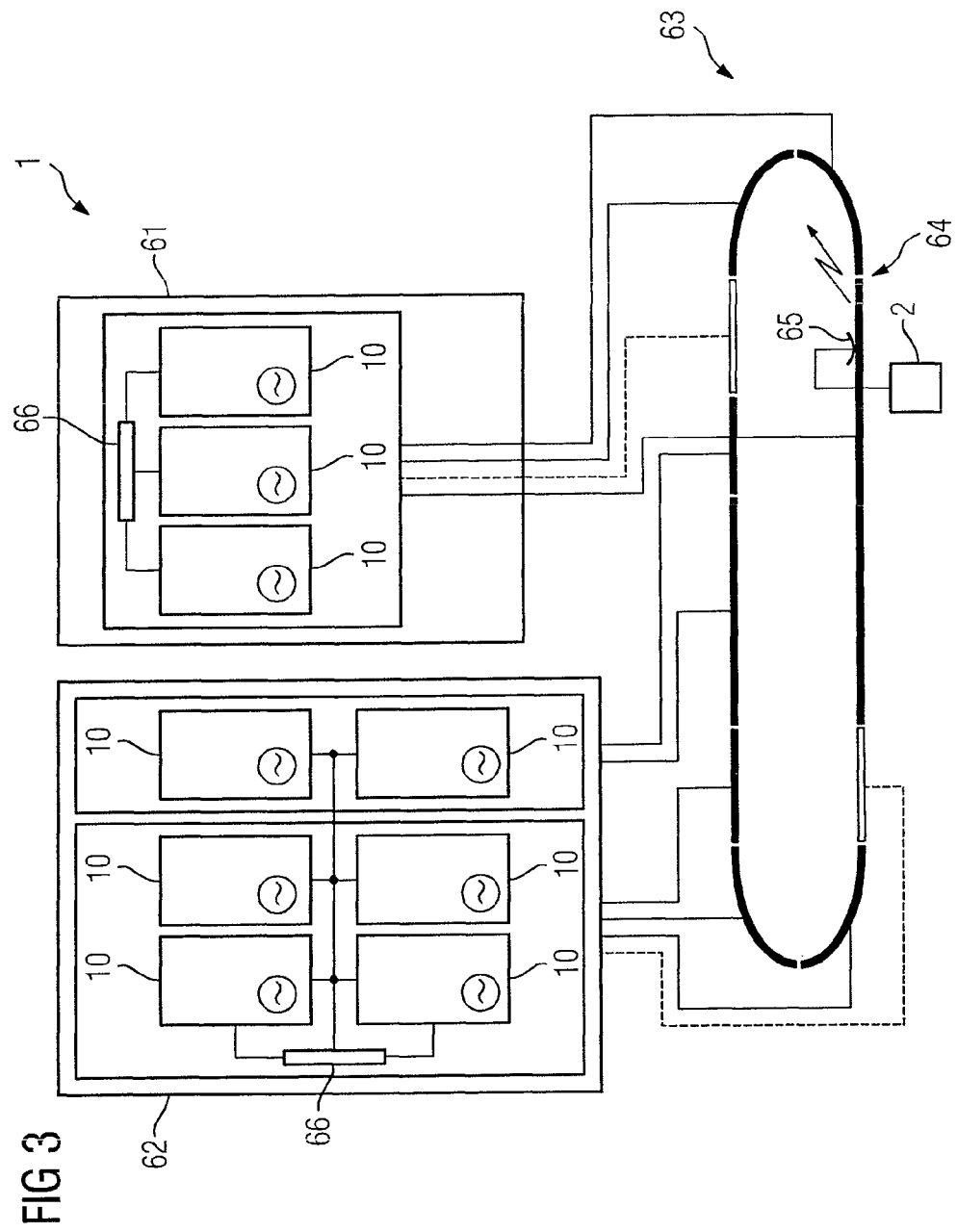
FIG. 3 is a schematic block diagram illustrating a group formation of travel segments in accordance with the invention.

According to FIG. 3, a first group 61 and a second group 62 of a transport system 1 are represented. The first group 61 comprises three segments with a control unit 10 allocated to each of the segments. The three control units 10 are synchronized with one another by the synchronization device 66 and corresponding synchronization lines.

The second group 62 comprises six segments, where the six segments likewise have six control units 10, with a signal generator being allocated to each of them, and where the control units and signal generators respectively are likewise synchronized with one another by a synchronization device 66 and corresponding synchronization lines. Due to the fact that, in the example of an electric suspended railway, the vehicle 2 slides from segment to segment by at least one first collector 65 on a conductor rail for communication, a short-circuit may occur at a short-circuit point 64, which forms a transition from one segment to another segment, due to the collector 65.

The short-circuit could incur a fault in the communication. This fault is identified, due to a first error identification device 71 in the control unit 10 (see FIG. 1) and a second error identification device 72 in the vehicle 2 (see FIG. 1), and is rejected as subject to error. Because both the segments are synchronized in respect of the data transfer, a renewed data transfer can occur, where the vehicle 2 has already moved away over the short-circuit point 64, and no further fault is to be anticipated. The return channel, however, due to the synchronization and the decoupling devices 30 and 30', is always functionally independent of the forward channel.

Further details and technical features of relevance to the present invention are the following:

Automated electric suspended railways or conveying systems, such as are used, for example, in the automobile industry, consist of an individually different number of transport or travel wagons, which are monitored from a central control unit. The transport track is usually a rail system, which is subdivided into segment sections. Any desired number of transport wagons can be located on a segment, although the number is often limited for mechanical and logistics reasons.

In order for the behavior and therefore the travel profile of the transport wagons to be able to be adapted within the production facility to the different manufacturing processes, communication is necessary between the central system control unit and the transport wagons. Moreover, it is important for the central control unit to be informed in real time of the behavior of the transport wagons. In this situation, it must be borne in mind that the distances to be bridged can easily amount to 1000 meters and more. Operational reliability must be appropriate for the industrial environment. Contact reliability of the sliding contacts or collectors, respectively, must guarantee secure communication behavior even in the event of contamination by dirt. At segment transitions, too, secure communication behavior must be guaranteed, because the short-circuits already mentioned can occur between the segments, if a transport wagon happens to be at that point just when a control command or status message is imposed.

It must be ensured at all times that, in the event of faults, communication can be restored without notable information loss. This assurance is preferably guaranteed by synchronization.

Memory-programmable segment control units and transport wagon control units are usually used to achieve a data exchange between a system of centralized or decentralized arrangement and the transport wagons which move on the segmented rail system. On the system side, the segment control units are permanently installed and transmit via a communication channel (in most cases electrically conducting rails with slide contacts on the transport wagons) productive data, such as the travel speed, to the transport wagons. In turn, the transport wagon control units transfer individual data, such as behavior or error information, to the segment control units.

The term "system of centralized arrangement" is to be understood to mean a central automation system for the transport system, and "system of decentralized arrangement" is to be understood to mean a distributed automation system.

The segments can be installed such that, when the segment boundaries or connections, respectively, are traveled over by the transport wagon slide contact elements, short-circuits may occur between the information lines of the adjacent segments.

Special data exchange segments could also be provided, in which, in this case, a clear peer-to-peer communication can occur. There should then be only one transport wagon present in this segment. The coupling of these data exchange segments to the adjacent segments occurs with information line isolation elements, which must reliably isolate the length of the sliding contact. This isolation is not meant in the electrical sense, but only in the "logical" sense; error messages will continue to be transferred in these segments, but new control information or data transfer information in the direction of the vehicle cannot be transferred there. In this case, only the transfer of the start bits occurs (idle mode).

The electric suspended railway system can be arranged either centralized or decentralized, where the decentralized arrangement has the advantage of shorter and less fault-prone wiring paths to the segments.

The information transfer (forward and return channels) preferably occurs by a broadcast, i.e., unadressed. It is possible, however, with the method described, for both "jointly unacknowledged" as well as "jointly acknowledged" data messages to be transferred:

"Jointly acknowledged" are, as a rule, what are referred to as the control commands or simple parametering, which do not require explicit acknowledgement but contain as feedback only a simple status or collective error message.

"Jointly acknowledged" is the situation when exactly one response is made to each request. Both request and response run in broadcast mode, however. It is therefore possible for a data transfer, for example, for the purpose of parametering of the segment control units, to occur as a broadcast to all the transport wagons. This transfer is acknowledged jointly by all the transport wagons.

If it is intended, however, that a defined data transfer (request-response) should be performed from a segment to a transport wagon and/or back again (e.g., targeted parametering or error history), then this is to be performed in the data exchange segment described heretofore.

It is also conceivable for a data transfer to be performed for the purpose of a firmware update from the segment control units to all the transport wagons, likewise as a broadcast. This transfer is likewise acknowledged jointly by all the transport wagons. As a rule, no productive operation may take place in this situation. As a result, any necessary dealing with an error by message repetition would be non-critical.

The method allows for unacknowledged transfers to be mixed with acknowledged transfer, i.e., control commands with explicit data transfer commands. In order to differentiate this acknowledgement necessity, additional identification information is added to the transfer messages.

In order for information line short-circuits between adjacent segments to be tolerated with minimal communication loss, all the segment control units within a group should be synchronized.

A group should be, for example, a switch cabinet or a switch cabinet group, with a corresponding number of segment controls or control units. Within a group, all data transfers occur synchronized. This has the advantage that, in the event of segment short-circuits due to the wagons, communication will basically not be disrupted by superimpositions. The same logic isolation element is located between the groups described that has already been described heretofore for the separation of the individual segments. This isolation element can also be realized by a sensor-controlled switchover (wagon travels out of the old group—wagon travels into the new group), where the switched-over segment would be supplied, depending on the requirement, from a group 1 or a group 2.

The data transfer method in accordance with the invention therefore allows for an information superimposition (dominance, no arbitration necessary), i.e., for the return channel from the transport wagon to the segment. For the forward channel, with the same information from adjacent segments, likewise no difficulties arise, but, if it should happen that the information is different, then this is recognized by the information securing mechanism, and the transport wagons cannot obtain any current information for the short period of the short-circuit (the return channel is, however, guaranteed in this situation—see above—because important information is transferred in dominance mode).

The term "dominance" in this situation, in the event of a data superimposition, is to be understood to mean that an item of information dominates, which operates with a switched half-wave, in relation to an item of information which operates with a non-switched half-wave.

In the event of a short-circuit between several segments, dominance signifies a falsification of the control commands (forward channel). This is recognized by the checksum.

In the event of the presence of several vehicles in a segment, dominance signifies a superimposition of the status messages. Status messages should be provided with such dominant information. Error messages can therefore always be evaluated.

A low-harmonic baseband data transfer occurs with adequate performance for a broad range of transport tasks:

The carrier signal is provided from one generator in each case for each segment. This generator does not produce a continuous signal, but permanently produces frames ("bursts") of a precisely defined length in each case. The generator is represented by a pulse width modulator (PWM) with downstream LC filter, which, by means of the digital signal processing (DSP) control device, can therefore produce a freely-programmable envelope curve. The PWM switching frequency is, if appropriate, also capable of being wobbled, such that resonance effects can very largely be avoided.

The data transfer occurs in the multiplex process (forward and return channels time-multiplex interleaved, but separated from one another by positive and negative half-wave information (see FIG. 2.)

Forward Channel: Positive Half-Wave

A low-resistance feed of the rail segment occurs with the positive half-wave. The load resistance R2 is located in the transport wagon, and therefore each transport wagon "takes" precisely the current that is determined by this resistance R2 and by the voltage imposed by the segment. Accordingly, the physically necessary minimum current flow (approx. 10 mA) for each transport wagon is guaranteed for each half-wave of the forward direction, in order to guarantee a "cleaning" process of the rail system. A dielectric breakdown due to possible dirt and oxide layers on the rail system is referred to as a "cleaning" process.

Return Channel: Negative Half-Wave

The negative half-wave is offered by the segment to all the transport wagons, and the load resistance R1, in contrast to the forward channel, is located in the segment. Each transport wagon synchronizes itself on the start identifier signal, and then imposes its return-channel information in a serial manner on the rail system of the segment. The synchronization occurs by continuous scanning of the segment transmission signal by ND converters, as well as suitable filtering in the transport wagon. Preferably, all the filters are realized in digital form in the signal processor, but pre-filtering against spikes occurs as analog.

Due to the diode decoupling of the forward and return channels, problem-free actuation of the switches is possible, following the "rough" synchronization referred to above, which can or should already occurs well before or after the zero passage (see FIG. 2). Accordingly, the entire positive or negative half-wave is used for the signal transfer, respectively.

A differential transfer over a full bridge (positive and negative voltages on the rail system), as a result of its symmetrical level circumstances, allows for a low-interference data transfer. It is more resistant to symmetrical capacitative or inductive couplings into the cables from the segment control unit to the respective segments, where the additional advantage of the decentralized technology with its comparatively short wiring paths takes effect.

An LC filtering process allows for the integration of the inherently harmful cable impedance (predominantly capacitative in the context of conventional cable lengths and types) as a useful oscillating circuit element, and its necessary damping. By means of a suitable arrangement of the component elements, it is possible (C should be some 10× as large as the maximum cable capacitance which is to be anticipated) to ignore very largely the influences of cable length, and therefore to do without balancing of the system. The LC filtering with the resonance frequency is sufficiently precisely matched to the PWM modulation frequency for interfering harmonics of the envelope curve on the loop lines to be avoided. Redistribution procedures by the capacitative portion of the cables are therefore integrated into the dimensioning, and therefore do not cause any additional losses in the PWM stage. The PWM losses are reduced to the normal switchover losses of any and every bridge circuit.

A deliberate separation occurs between the generation of the basic data transfer frames and the actual modulation (information imposition of the useful signal). Only this separation allows for a simple information superimposition; i.e., in the event of possible short-circuits between segments, it is always the 1-information bits that dominate over the 0-information bits. This applies to both the forward as well as the return channel. The clear relationships created by this method in superimpositions allow, for example, during return channel transfer, for appropriate error dominance. If such an error superimposition occurs, then the checksum generated in each transport wagon is to be rejected by the segment control unit to secure information, and attention paid to the dominance of the error messages.

As a result of the clear dominance it is possible for the return channel, which usually contains the status and error messages, to notify a group error, which can also signal a total failure of a transport wagon. A relay can be used for this purpose, which bridges the second switching device S2 with its break contact. This relay is actuated at the moment at which the controller of the transport wagon determines that all the conditions for its function in the proper manner are fulfilled. If this condition is not fulfilled, which can also be the case, for example, in the event of the total failure of the drive, including the motor protecting switch, then a sustained actuation of the return channel will occur, which signals to the segment control unit that the segment concerned is seriously disrupted.

Because of the transfer reliability, the highest voltage possible is required, and the current associated with this highest voltage should also be selected as high as necessary to maintain the current flow even through dirt and oxide layers of the transfer rails. In this situation, it is therefore necessary to achieve a balance between transfer reliability and power loss.

The series resistances or load resistances R1, R2 for the forward and return directions can be adjusted separately (depending on the maximum number of transport wagons on one or more adjacent segments).

As a consequence of the relative low resistance, what are referred to as floating voltages (capacitative cross-couplings from the supply lines for the drive onto the information lines) will be minimized.

The transfer of broadcast information occurs in the time-multiplex process in the baseband.

The transfer of data in the forward and return channels occurs with very low-harmonic signals. This allows for low interference even over large spatial distances with appropriate performance.

Synchronization related to a group saves elaborate synchronization over several switch cabinets, and therefore over long distances, which in turn avoids the problems of a fault-resistant real-time synchronization pulse transfer. By contrast, inside a switch cabinet this can be well mastered with standard technology. With the synchronization method, however, it is possible to synchronize across switch cabinets, and therefore to regard the entire system as a group.

The method allows, by separation of the signal generator from the modulator, for a defined signal superimposition for forward and return channels with synchronized transfer.

By the introduction of local signal generators per segment, a high error tolerance of the entire system is possible, because the failure of individual segments does not automatically incur the failure of the entire system. This means that, in the event of an incident, all the wagons that are not affected can be operated properly.

The method allows for a signal transfer by way of a freely-programmable envelope curve and a variable envelope curve frequency (carrier frequency for the frame/burst). The words "carrier frequency" is defined here with the start pulse excluded.

A group error message for the return channel, independent of the functional performance of the electronics, by relays or other electrical, electromechanical, or electronic switching elements is possible without impairing the transfer from the segment to the still intact transport wagons for the forward channel.

The capacity for resetting after data transfer faults is readily provided because of unambiguous start identification in the frame. There is accordingly no need for an "overpriced" increase in the channel capacity, simply due to possible multiple re-synchronization failures.

As a result of a special identifier, mixed command types one after another are possible in one segment (acknowledged and non-acknowledged commands).

Due to the restriction to the levels absolutely necessary (approx. 40 . . . 50V with currents of approx. 10 mA), power losses are minimal, by contrast with high-voltage techniques, and also allow for compact structural design.

Figure 4:
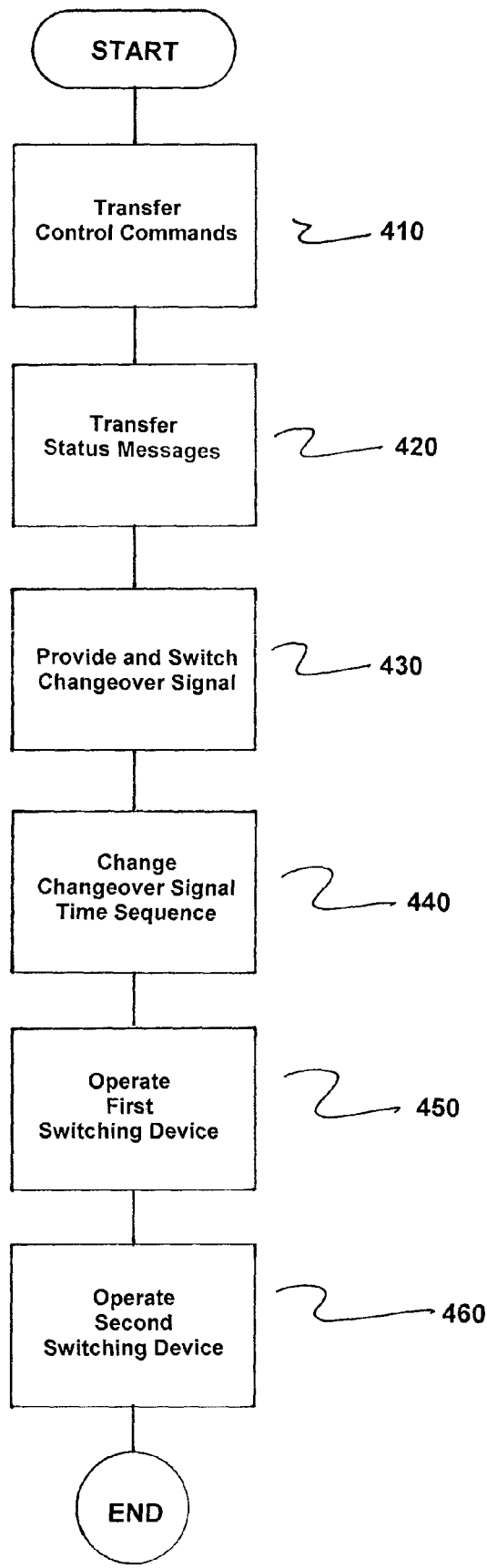
FIG. 4 is a flowchart of the method in accordance with the invention.

FIG. 4 is a flowchart of the method for A method for data exchange in a transport system. The method comprises transferring control commands from a control unit to a vehicle, as indicated in step 410.

Status messages are then transferred from the vehicle to the control unit, as indicated in step 420. A changeover signal is provided by a signal generator, and the changeover signal is switched to a first data line and a second data line, as indicated in step 430.

Next, a time sequence of the changeover signal is changed to transfer at least one of the control commands and the status messages via changes in the time sequence of the changeover signal, as indicated in step 440.

A first switching device is operated in the control unit to change positive half-waves of the changeover signal, as indicated in step 450. A second switching device is then operated in the vehicle to change negative half-waves of the changeover signal in a circuit formed by the first and second data lines, such that binary values are transferred back-and-forth between the control unit and the vehicle, as indicated in step 460. Here, data exchange of the control commands and status messages occurs substantially simultaneously via a changed changeover signal.

While there have been shown, described and pointed out fundamental novel features of the invention as applied to a preferred embodiment thereof, it will be understood that various omissions and substitutions and changes in the form and details of the methods and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for data exchange in a transport system, the method comprising the steps of:
   transferring control commands from a control unit to a vehicle;
   transferring status messages from the vehicle to the control unit;
   providing a changeover signal by a signal generator, and switching the changeover signal to a first data line and a second data line;
   changing a time sequence of the changeover signal to transfer at least one of the control commands and the status messages via changes in the time sequence of the changeover signal;
   operating a first switching device in the control unit to change positive half-waves of the changeover signal; and
   operating a second switching device in the vehicle to change negative half-waves of the changeover signal in a circuit formed by the first and second data lines, such that binary values are transferred back-and-forth between the control unit and the vehicle, data exchange of the control commands and status messages occurring substantially simultaneously via a changed changeover signal.

2. The method as claimed in claim 1, wherein
   a first decoupling device located in the control unit is configured to conduct the negative half-waves to a first evaluation device and thereby detect the status messages; and
   a second decoupling device located in the vehicle is configured to conduct the positive half-waves to a second evaluation device and detect the control commands.

3. The method as claimed in claim 1, wherein the signal generator is operated such that the signal generator provides the changeover signal for a limited period of time as a message packet which is repeated and provided cyclically.

4. The method as claimed in claim 2, wherein the signal generator is operated such that the signal generator provides the changeover signal for a limited period of time as a message packet which is repeated and provided cyclically.

5. The method as claimed in claim 3, wherein each message packet includes a start identifier signal which differs in one of frequency, waveform and amplitude from a carrier signal of the changeover signal, and a start point of the message packet is thereby identified.

6. The method as claimed in claim 1, wherein a plurality of travel segments are utilized in the transport system as transport paths for the vehicle, and wherein a respective signal generator is allocated to each travel segment of the plurality of travel segments.

7. The method as claimed in claim 6, wherein one of a travel segment and the plurality of travel segments each form a group, and signal generators contained in groups are jointly synchronized in the transport system.

8. The method as claimed in claim 1, wherein a checksum is formed for each of the control commands and each of the status messages and transferred.

9. The method as claimed in claim 6, wherein a loop network is formed with the first data line and the second data line between the control unit and the vehicle; and
   wherein, in an event of a fault in the data exchange in the loop network, the fault is identified by a securing mechanism.

10. The method as claimed in claim 9, wherein the fault comprises a short-circuit between two travel segments incurred by a collector of the vehicle, which is traveling from one travel segment to an adjacent travel segment.

11. A vehicle control system for data exchange in a transport system, comprising:
 a control unit configured to transfer control commands to a vehicle configured to transfer status messages to the control unit;
 a signal generator connected to a first data line and a second data line, the signal generator providing a changeover signal;
 a first switching device arranged in the control unit and configured to change positive half-waves of the changeover signal; and
 a second switching device arranged in the vehicle and configured to change negative half-waves of the changeover signal in a circuit formed by the first and second data lines to transfer binary values back-and-forth between the control unit and the vehicle.

12. The vehicle control system as claimed in claim 11, further comprising:
 a first evaluation device;
 a second evaluation device;
 a first decoupling device arranged in the control unit and coupled to the first evaluation device to conduct the negative half-waves to the first evaluation device and detect the status messages; and
 a second decoupling device arranged in the vehicle and coupled to the second evaluation device to conduct the positive half-waves to the second evaluation device and detect the control commands.

13. The vehicle control system as claimed in claim 11, further comprising:
 a first arithmetic unit coupled to the signal generator and configured to control the signal generator such that the changeover signal is provided for a limited period of time as a message packet which is repeated and provided cyclically.

14. The vehicle control system as claimed in claim 12, further comprising:
 a first arithmetic unit coupled to the signal generator and configured to control the signal generator such that the changeover signal is provided for a limited period of time as a message packet which is repeated and provided cyclically.

15. The vehicle control system as claimed in claim 13, wherein each message packet includes a start identifier signal, which differs in one of frequency, waveform and amplitude from a carrier signal of the changeover signal, and a start point of the message packet is thereby identified.

16. The vehicle control system as claimed in claim 11, wherein the transport system includes a plurality of travel segments as transport paths for the vehicle, and wherein a signal generator is allocated to each travel segment of the plurality of travel segments.

17. The vehicle control system as claimed in claim 16, wherein one of a travel segment and the plurality of travel segments each form a group, and signal generators contained in groups are jointly synchronized in the transport system.

18. The vehicle control system as claimed in claim 11, wherein the control unit includes a first error identification device and the vehicle includes a second error identification device.

19. The vehicle control system as claimed in claim 18, wherein the first data line and the second data line comprise a loop network between the control unit and the vehicle; and
 wherein, in an event of a fault in the data exchange in the loop network, the fault is identifiable by the first and second error identification devices.

20. The vehicle control system as claimed in claim 19, wherein the fault comprises a short-circuit between two travel segments incurred by a collector of the vehicle, which is traveling from one travel segment to an adjacent travel segment.

21. The vehicle control system as claimed in claim 13, wherein the first arithmetic unit is configured to control the first switching device such that, by switching the first switching device, the binary values are imposed on a changeover signal in which a half-wave is suppressed.

* * * * *